(12) United States Patent
Luo et al.

(10) Patent No.: US 11,785,230 B2
(45) Date of Patent: *Oct. 10, 2023

(54) METHODS AND APPARATUS FOR VIDEO USABILITY INFORMATION (VUI) FOR SCALABLE VIDEO CODING (SVC)

(71) Applicant: InterDigital VC Holdings, Inc., Wilmington, DE (US)

(72) Inventors: Jiancong Luo, Skillman, NJ (US); Lihua Zhu, San Jose, CA (US); Peng Yin, Ithaca, NY (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,698

(22) Filed: Feb. 16, 2022

(65) Prior Publication Data

US 2022/0174296 A1 Jun. 2, 2022

Related U.S. Application Data

(63) Continuation of application No. 17/130,155, filed on Dec. 22, 2020, now Pat. No. 11,290,732, which is a continuation of application No. 16/670,130, filed on Oct. 31, 2019, now Pat. No. 10,897,626, which is a continuation of application No. 16/180,168, filed on Nov. 5, 2018, now Pat. No. 10,511,845, which is a (Continued)

(51) Int. Cl.
*H04N 7/12* (2006.01)
*H04N 19/30* (2014.01)
*H04N 19/70* (2014.01)

(52) U.S. Cl.
CPC ............ *H04N 19/30* (2014.11); *H04N 19/70* (2014.11)

(58) Field of Classification Search
CPC ......... H04N 19/30; H04N 19/70; H04N 19/31
USPC ................................................... 375/240.02
See application file for complete search history.

(56) References Cited

U.S. PATENT DOCUMENTS 6,055,012 A * 4/2000 Haskell ................. H04N 19/82
348/E13.058
6,757,450 B1 6/2004 Gershony et al.
(Continued)

FOREIGN PATENT DOCUMENTS

JP 2004040739 A 2/2004
WO 2005112464 A1 11/2005

OTHER PUBLICATIONS

Zhu et al., "SVC Hypothetical Reference Decoder", Document: JVT-V068r2, Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, pp. 1-10, Jan. 13-19, 2007.

(Continued)

*Primary Examiner* — Gims S Philippe
(74) *Attorney, Agent, or Firm* — Xiaoan Lu

(57) ABSTRACT

There are provided methods and apparatus for video usability information (VUI) for scalable video coding (SVC). An apparatus includes an encoder (100) for encoding video signal data into a bitstream. The encoder specifies video user information, excluding hypothetical reference decoder parameters, in the bitstream using a high level syntax element. The video user information corresponds to a set of interoperability points in the bitstream relating to scalable video coding (340, 355).

20 Claims, 5 Drawing Sheets

Related U.S. Application Data continuation of application No. 15/728,338, filed on Oct. 9, 2017, now Pat. No. 10,154,272, which is a continuation of application No. 12/450,647, filed as application No. PCT/US2008/003655 on Mar. 20, 2008, now Pat. No. 9,826,243.

(60) Provisional application No. 60/911,490, filed on Apr. 12, 2007.

(56) References Cited

U.S. PATENT DOCUMENTS

| | | | |
|---|---|---|---|
| 7,535,383 | B2 | 5/2009 | Segall et al. |
| 7,720,096 | B2 | 5/2010 | Klemets |
| 8,014,450 | B2 | 9/2011 | Regunathan et al. |
| 8,238,439 | B2 | 8/2012 | Pandit et al. |
| 8,345,754 | B2 | 1/2013 | Rivas-Corbera et al. |
| 8,351,514 | B2 | 1/2013 | Narasimhan et al. |
| 8,355,448 | B2 | 1/2013 | Hannuksela et al. |
| 8,401,085 | B2 | 3/2013 | Park et al. |
| 8,406,294 | B2 | 3/2013 | Mathew et al. |
| 8,436,889 | B2 | 5/2013 | Eleftheriadis et al. |
| 8,699,583 | B2 | 4/2014 | Hannuksela et al. |
| 8,774,266 | B2 | 7/2014 | Wang et al. |
| 9,161,032 | B2 | 10/2015 | Hannuksela et al. |
| 9,179,157 | B2 * | 11/2015 | Zhu .................. H04N 19/31 |
| 9,319,717 | B2 | 4/2016 | Hannuksela et al. |
| 2002/0063792 | A1 | 5/2002 | Speed et al. |
| 2002/0067369 | A1 | 6/2002 | Sullivan |
| 2005/0083218 | A1 | 4/2005 | Regunathan et al. |
| 2005/0254575 | A1 | 11/2005 | Hannuksela et al. |
| 2007/0019723 | A1 | 1/2007 | Valente |
| 2007/0071097 | A1 | 3/2007 | Koto |
| 2007/0110150 | A1 | 5/2007 | Wang et al. |
| 2007/0115814 | A1 * | 5/2007 | Gerla .................. H04L 1/0014 370/468 |
| 2008/0095228 | A1 | 4/2008 | Hannuksela et al. |
| 2008/0117985 | A1 | 5/2008 | Chen et al. |
| 2008/0181298 | A1 | 7/2008 | Shi et al. |
| 2008/0194246 | A1 * | 8/2008 | Klein .................. H04W 8/082 455/422.1 |
| 2009/0034626 | A1 | 2/2009 | Park et al. |
| 2009/0161762 | A1 | 6/2009 | Jun et al. |

OTHER PUBLICATIONS

Zhu et al., "SVC Hypothetical Reference Decoder", Document: JVT-V068, Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, pp. 1-10, Jan. 13-19, 2007.

Reichel, "Joint Scalable Video Model JSVM-9", Document: JVT-U202, Joint Video Team (JVT) of ISO/IEC MPEG & ITU-T VCEG (ISO/IEC JTC1/SC29/WG11 and ITU-T SG16 Q.6), 22nd Meeting: Marrakech, Morocco, pp. 1-127, Jan. 13-19, 2007.

Luo et al., "VUI updates for SVC", Document: JVT-W064r1, Joint Video Team (JVT) of ISO/IEC MPEG & ITU-T VCEG (ISO/IEC JTC1/SC29/WG11 and ITU-T SG16 Q.6), 23rd Meeting: San Jose, California, USA, pp. 1-8, Apr. 21-27, 2007.

Wiegand, "Joint Draft 9 of SVC Amendment with proposed changes," Draft ISO/IEC 14496-10, ISO/IEC JTC 1/SC 29/WG 11 N8751, Marrakech, Morocco, pp. 1-90, Jan. 2007.

Joint Draft 9 of SVC Amendment with proposed changes continued 2, Draft ISO/IEC 14496-10, pp. 1-90, (2006).

Joint Draft 9 of SVC Amendment with proposed changes continued 3, Draft ISO/IEC 14496-10, pp. 1-90, (2006).

Joint Draft 9 of SVC Amendment with proposed changes continued 4, Draft ISO/IEC 14496-10, pp. 1-90, (2006).

Joint Draft 9 of SVC Amendment with proposed changes continued 5, Draft ISO/IEC 14496-10, pp. 1-90, (2006).

Joint Draft 9 of SVC Amendment with proposed changes continued 6, Draft ISO/IEC 14496-10, pp. 1-72, (2006).

Guo et al., "On discardable lower layer adaptations", Document: JVT-S039, Joint Video Team (JVT) of ISO/IEC MPEG & ITU-T VCEG (ISO/IEC JTC1/SC29/WG11 and ITU-T SG16 Q.6), 19th Meeting: Geneva, pp. 1-11, Mar. 31-Apr. 7, 2006.

Zhu et al., "SVC Hypothetical Reference Decoder", Document: JVT-V068r4, Joint Video Team (JVT) of ISO/IEC MPEG & ITU-T VCEG (ISO/IEC JTC1/SC29/WG11 and ITU-T SG16 Q.6) 22nd Meeting: Marrakech, Morocco, pp. 1-7, Jan. 13-19, 2007.

Anonymous, "Advanced video coding for generic audiovisual services", Series H: Audiovisual and Multimedia Systems Infrastructure of audiovisual services—Coding of moving video, ITU-T Telecommunication Standardization Sector of ITU, H.264, pp. 1-282, (May 2003).

* cited by examiner

METHODS AND APPARATUS FOR VIDEO USABILITY INFORMATION (VUI) FOR SCALABLE VIDEO CODING (SVC)

CROSS-REFERENCE TO RELATED APPLICATIONS

This application is a continuation of co-pending U.S. application Ser. No. 17/130,155, filed Dec. 22, 2020, which is a continuation of U.S. application Ser. No. 16/670,130, filed Oct. 31, 2019 (U.S. Pat. No. 10,897,626), which is a continuation of U.S. application Ser. No. 16/180,168, filed Nov. 5, 2018, (U.S. Pat. No. 10,511,845), which is a continuation of U.S. application Ser. No. 15/728,338, filed Oct. 9, 2017 (U.S. Pat. No. 10,154,272), which is a continuation U.S. application Ser. No. 12/450,647, filed Oct. 1, 2009 (U.S. Pat. No. 9,826,243), which is a National Phase entry under 35 U.S.C. § 371 of International Application No. PCT/US2008/003655, filed Mar. 20, 2008, which claims the benefit of U.S. Provisional Application Ser. No. 60/911,490, filed Apr. 12, 2007, which is incorporated by reference herein in its entirety.

TECHNICAL FIELD

The present principles relate generally to video encoding and decoding and, more particularly, to methods and apparatus for video usability information (VUI) for scalable video coding (SVC).

BACKGROUND

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard") specifies syntax and semantics of the Video Usability Information (VUI) parameters of the sequence parameter sets. VUI includes information of aspect ratio, over-scanning, video signal type, chroma location, timing, Network Abstraction Layer (NAL) Hypothetical Reference Decoder (HRD) parameters, Virtual Coding Layer (VCL) HRD parameters, bitstream restriction, and so forth. The syntax of VUI parameters in the MPEG-4 AVC Standard is shown in TABLE 1.

TABLE 1

|  | C | Descriptor |
|---|---|---|
| vui_parameters( ) { | | |
| aspect_ratio_info_present_flag | 0 | u(1) |
| if( aspect_ratio_info_present_flag ) { | | |
| aspect_ratio_idc | 0 | u(8) |
| if( aspect_ratio_idc = = Extended_SAR ) { | | |
| sar_width | 0 | u(16) |
| sar_height | 0 | u(16) |
| } | | |
| } | | |
| overscan_info_present_flag | 0 | u(1) |
| if( overscan_info_present_flag ) | | |
| overscan_appropriate_flag | 0 | u(1) |
| video_signal_type_present_flag | 0 | u(1) |
| if( video_signal_type_present_flag ) { | | |
| video_format | 0 | u(3) |
| video_full_range_flag | 0 | u(1) |
| colour_description_present_flag | 0 | u(1) |
| if( colour_description_present_flag ) { | | |

TABLE 1-continued

|  | C | Descriptor |
|---|---|---|
| colour_primaries | 0 | u(8) |
| transfer_characteristics | 0 | u(8) |
| matrix_coefficients | 0 | u(8) |
| } | | |
| } | | |
| chroma_loc_info_present_flag | 0 | u(1) |
| if( chroma_loc_info_present_flag ) { | | |
| chroma_sample_loc_type_top_field | 0 | ue(v) |
| chroma_sample_loc_type_bottom_field | 0 | ue(v) |
| } | | |
| if( profile_idc = = 'SVC') { | | |
| num_layers_minus1 | 0 | ue(v) |
| for( i = 0; i <= num_layers_minus1; i++ ) { | | |
| temporal_level[ i ] | 0 | u(3) |
| dependency_id[ i ] | 0 | u(3) |
| quality_level[ i ] | 0 | u(2) |
| timing_info_present_flag[ i ] | 0 | u(1) |
| if( timing_info_present_flag[ i ] ) { | | |
| num_units_in_tick[ i ] | 0 | u(32) |
| time_scale[ i ] | 0 | u(32) |
| fixed_frame_rate_flag[ i ] | 0 | u(1) |
| } | | |
| nal_hrd_parameters_present_flag[ i ] | 0 | u(1) |
| if( nal_hrd_parameters_present_flag[ i ] ) | | |
| hrd_parameters( ) | | |
| vcl_hrd_parameters_present_flag[ i ] | 0 | u(1) |
| if( vcl_hrd_parameters_present_flag[ i ]) | | |
| hrd_parameters( ) | | |
| if( nal_hrd_parameters_present_flag[ i ] \| \| | | |
| vcl_hrd_parameters_present_flag[ i ] ) | | |
| low_delay_hrd_flag[ i ] | 0 | u(1) |
| pic_struct_present_flag[ i ] | 0 | u(1) |
| } | | |
| } else { | | |
| timing_info_present_flag | 0 | u(1) |
| if( timing_info_present_flag ) { | | |
| num_units_in_tick | 0 | u(32) |
| time_scale | 0 | u(32) |
| fixed_frame_rate_flag | 0 | u(1) |
| } | | |
| nal_hrd_parameters_present_flag | 0 | u(1) |
| if( nal_hrd_parameters_present_flag ) | | |
| hrd_parameters( ) | | |
| vcl_hrd_parameters_present_flag | 0 | u(1) |
| if( vcl_hrd_parameters_present_flag ) | | |
| hrd_parameters( ) | | |
| if( nal_hrd_parameters_present_flag \| \| | | |
| vcl_hrd_parameters_present_flag ) | | |
| low_delay_hrd_flag | 0 | u(1) |
| pic_struct_present_flag | 0 | u(1) |
| } | | |
| bitstream_restriction_flag | 0 | u(1) |
| if( bitstream_restriction_flag ) { | | |
| motion_vectors_over_pic_boundaries_flag | 0 | u(1) |
| max_bytes_per_pic_denom | 0 | ue(v) |
| max_bits_per_mb_denom | 0 | ue(v) |
| log2_max_mv_length_horizontal | 0 | ue(v) |
| log2_max_mv_length_vertical | 0 | ue(v) |
| num_reorder_frames | 0 | ue(v) |
| max_dec_frame_buffering | 0 | ue(v) |
| } | | |
| } | | |

VUI provides extra information of the bitstream to the user for a variety of purposes. For example, in bitstream restriction information, VUI specifies: (1) if the motion is over picture boundary; (2) maximal bytes per picture; (3) maximal bits per macroblock; (4) maximal motion vector length (horizontal and vertical); (5) number of reordering frames; and (6) maximal decoded frame buffer size. When the decoder sees the information, instead of using the "level" information to set the decoding requirement which, in general, is higher than what the bitstream actually requires, the decoder can customize its decoding operation based on the tighter limit.

SUMMARY

These and other drawbacks and disadvantages of the prior art are addressed by the present principles, which are directed to methods and apparatus for video usability information (VUI) for scalable video coding (SVC).

According to an aspect of the present principles, there is provided an apparatus. The apparatus includes an encoder for encoding video signal data into a bitstream. The encoder specifies video user information, excluding hypothetical reference decoder parameters, in the bitstream using a high level syntax element. The video user information corresponds to a set of interoperability points in the bitstream relating to scalable video coding.

According to another aspect of the present principles, there is provided a method. The method includes encoding video signal data into a bitstream. The encoding step includes specifying video user information, excluding hypothetical reference decoder parameters, in the bitstream using a high level syntax element. The video user information corresponds to a set of interoperability points in the bitstream relating to scalable video coding.

According to yet another aspect of the present principles, there is provided an apparatus. The apparatus includes a decoder for decoding video signal data from a bitstream. The decoder determines video user information, excluding hypothetical reference decoder parameters, from the bitstream using a high level syntax element. The video user information corresponds to a set of interoperability points in the bitstream relating to scalable video coding.

According to still another aspect of the present principles, there is provided a method. The method includes decoding video signal data from a bitstream. The decoding step includes determining video user information, excluding hypothetical reference decoder parameters, from the bitstream using a high level syntax element. The video user information corresponds to a set of interoperability points in the bitstream relating to scalable video coding.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
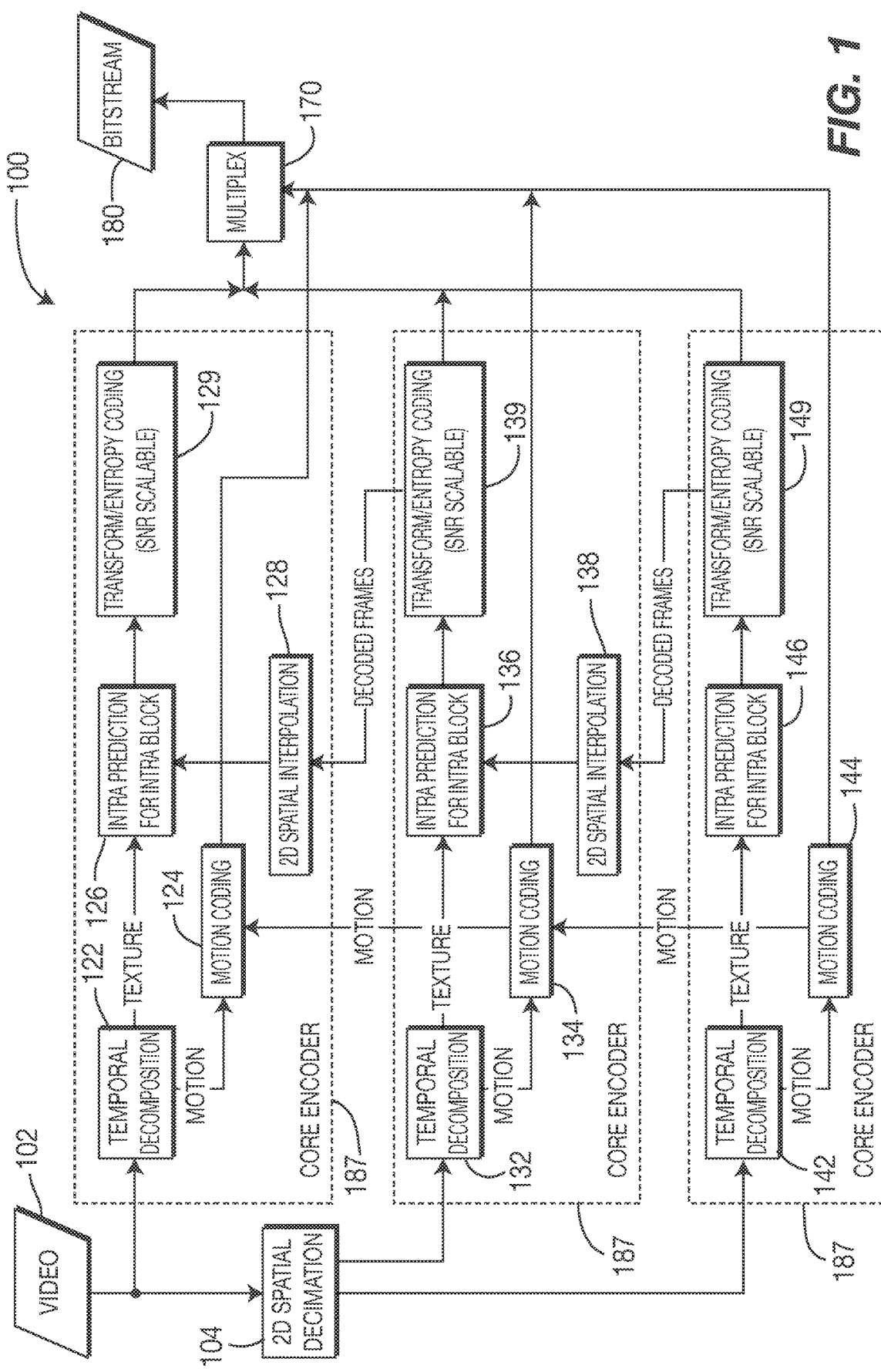
FIG. 1 is a block diagram for an exemplary scalable video encoder to which the present principles may be applied.

The present principles are directed to methods and apparatus for video usability information (VUI) for scalable video coding (SVC).

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Scalable video coding (SVC) is an extension (Annex G) to the MPEG-4 AVC Standard. In SVC, a video signal can be encoded into a base layer and one or more enhancement layers constructed in a pyramidal fashion. An enhancement layer enhances the temporal resolution (i.e., the frame rate), the spatial resolution, or simply the quality of the video content represented by another layer or part thereof. Each layer together with all its dependent layers is one representation of the video signal at a certain spatial resolution, temporal resolution, and quality level. Each layer in combination with all its dependent layers that require decoding the video signal at a certain spatial resolution, temporal resolution and quality level are denoted by an interoperability point (IOP), also referred to as operation points. An SVC bitstream typically has multiple IOPs, due at least in part to the fact that the bitstream is scalable. Such a bitstream may be scalable spatially, temporally, and in Signal-to-Noise Ratio (SNR), for example. Sub-bitstreams, corresponding to the scalable aspects, may be extracted from the bitstream.

Turning to FIG. 1, an exemplary scalable video encoder to which the present invention may be applied is indicated generally by the reference numeral 100.

A first output of a temporal decomposition module 142 is connected in signal communication with a first input of an intra prediction for intra block module 146. A second output of the temporal decomposition module 142 is connected in signal communication with a first input of a motion coding module 144. An output of the intra prediction for intra block module 146 is connected in signal communication with an input of a transform/entropy coder (signal to noise ratio (SNR) scalable) 149. A first output of the transform/entropy coder 149 is connected in signal communication with a first input of a multiplexer 140.

A first output of a temporal decomposition module 132 is connected in signal communication with a first input of an intra prediction for intra block module 136. A second output of the temporal decomposition module 132 is connected in signal communication with a first input of a motion coding module 134. An output of the intra prediction for intra block module 136 is connected in signal communication with an input of a transform/entropy coder (signal to noise ratio (SNR) scalable) 139. A first output of the transform/entropy coder 139 is connected in signal communication with a first input of a multiplexer 130.

A second output of the transform/entropy coder 149 is connected in signal communication with an input of a 2D spatial interpolation module 138. A second output of the motion coding module 144 is connected in signal communication with an input of the motion coding module 134.

A first output of a temporal decomposition module 122 is connected in signal communication with a first input of an intra predictor 126. A second output of the temporal decomposition module 122 is connected in signal communication with a first input of a motion coding module 124. An output of the intra predictor 126 is connected in signal communication with an input of a transform/entropy coder (signal to noise ratio (SNR) scalable) 129. An output of the transform/entropy coder 129 is connected in signal communication with a first input of a multiplexer 120.

A second output of the transform/entropy coder 139 is connected in signal communication with an input of a 2D spatial interpolation module 128. A second output of the motion coding module 134 is connected in signal communication with an input of the motion coding module 124.

A first output of the motion coding module 124, a first output of the motion coding module 134, and a first output of the motion coding module 144 are each connected in signal communication with a second input of the multiplexer 170.

A first output of a 2D spatial decimation module 104 is connected in signal communication with an input of the temporal decomposition module 132. A second output of the 2D spatial decimation module 104 is connected in signal communication with an input of the temporal decomposition module 142.

An input of the temporal decomposition module 122 and an input of the 2D spatial decimation module 104 are available as inputs of the encoder 100, for receiving input video 102.

An output of the multiplexer 170 is available as an output of the encoder 100, for providing a bitstream 180.

The temporal decomposition module 122, the temporal decomposition module 132, the temporal decomposition module 142, the motion coding module 124, the motion coding module 134, the motion coding module 144, the intra predictor 126, the intra predictor 136, the intra predictor 146, the transform/entropy coder 129, the transform/entropy coder 139, the transform/entropy coder 149, the 2D spatial interpolation module 128, and the 2D spatial interpolation module 138 are included in a core encoder portion 187 of the encoder 100.

Figure 2:
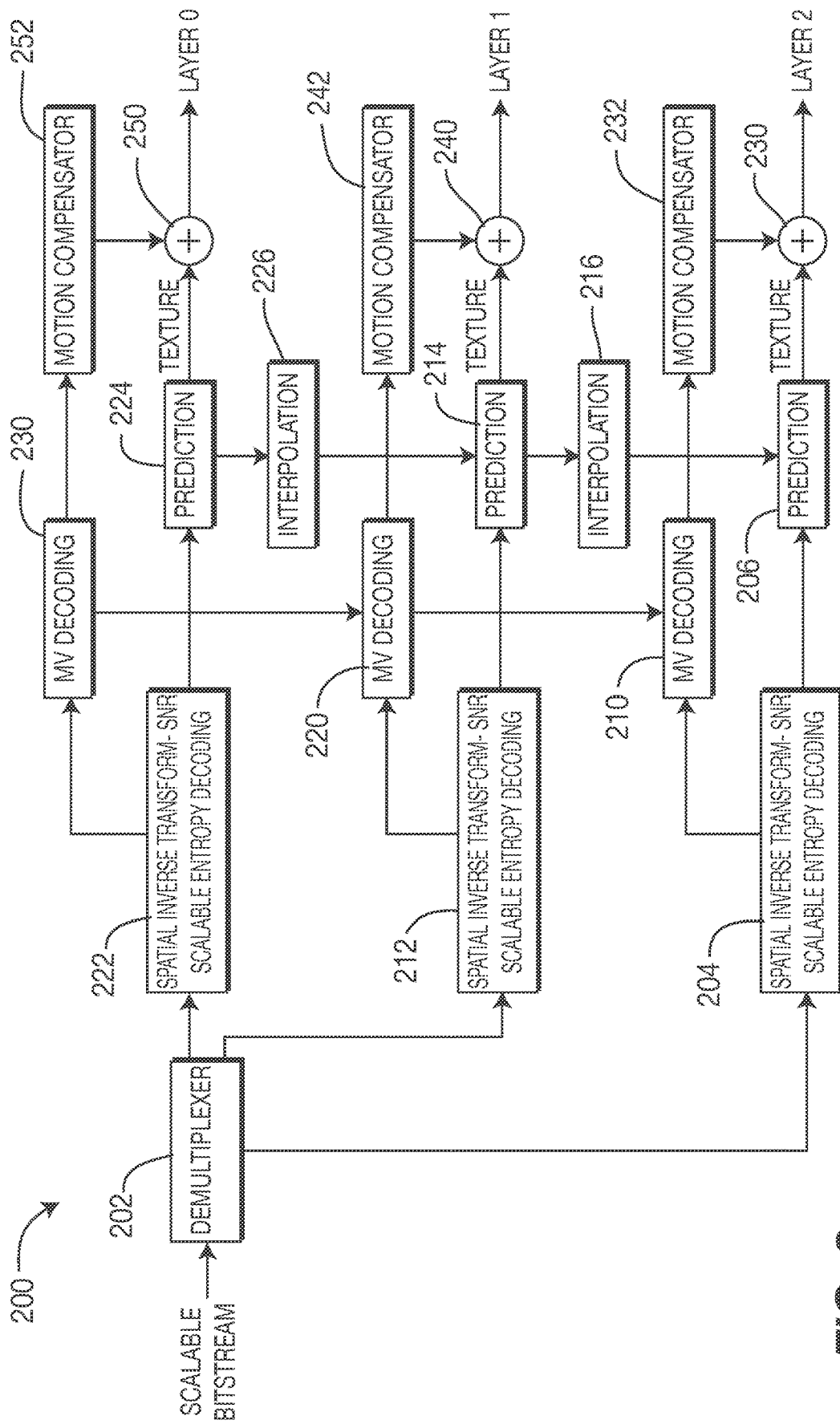
FIG. 2 is a block diagram for an exemplary scalable video decoder to which the present principles may be applied.

Turning to FIG. 2, an exemplary scalable video decoder to which the present invention may be applied is indicated generally by the reference numeral 200. An input of a demultiplexer 202 is available as an input to the scalable video decoder 200, for receiving a scalable bitstream. A first output of the demultiplexer 202 is connected in signal communication with an input of a spatial inverse transform SNR scalable entropy decoder 204. A first output of the spatial inverse transform SNR scalable entropy decoder 204 is connected in signal communication with a first input of a prediction module 206. An output of the prediction module 206 is connected in signal communication with a first input of a combiner 230.

A second output of the spatial inverse transform SNR scalable entropy decoder 204 is connected in signal communication with a first input of a motion vector (MV) decoder 210. An output of the MV decoder 210 is connected in signal communication with an input of a motion compensator 232. An output of the motion compensator is connected in signal communication with a second input of the combiner 230.

A second output of the demultiplexer 202 is connected in signal communication with an input of a spatial inverse transform SNR scalable entropy decoder 212. A first output of the spatial inverse transform SNR scalable entropy decoder 212 is connected in signal communication with a first input of a prediction module 214. A first output of the prediction module 214 is connected in signal communication with an input of an interpolation module 216. An output of the interpolation module 216 is connected in signal communication with a second input of the prediction module 206. A second output of the prediction module 214 is connected in signal communication with a first input of a combiner 240.

A second output of the spatial inverse transform SNR scalable entropy decoder 212 is connected in signal communication with a first input of an MV decoder 220. A first output of the MV decoder 220 is connected in signal communication with a second input of the MV decoder 210. A second output of the MV decoder 220 is connected in signal communication with an input of a motion compensator 242. An output of the motion compensator 242 is connected in signal communication with a second input of the combiner 240.

A third output of the demultiplexer 202 is connected in signal communication with an input of a spatial inverse transform SNR scalable entropy decoder 222. A first output of the spatial inverse transform SNR scalable entropy decoder 222 is connected in signal communication with an input of a prediction module 224. A first output of the prediction module 224 is connected in signal communication with an input of an interpolation module 226. An output of the interpolation module 226 is connected in signal communication with a second input of the prediction module 214.

A second output of the prediction module 224 is connected in signal communication with a first input of a combiner 250. A second output of the spatial inverse transform SNR scalable entropy decoder 222 is connected in signal communication with an input of an MV decoder 230. A first output of the MV decoder 230 is connected in signal communication with a second input of the MV decoder 220. A second output of the MV decoder 230 is connected in signal communication with an input of a motion compensator 252. An output of the motion compensator 252 is connected in signal communication with a second input of the combiner 250.

An output of the combiner 250 is available as an output of the decoder 200, for outputting a layer 0 signal. An output of the combiner 240 is available as an output of the decoder 200, for outputting a layer 1 signal. An output of the combiner 230 is available as an output of the decoder 200, for outputting a layer 2 signal.

We propose to modify Network Abstraction Layer (NAL) Hypothetical Reference Decoder (HRD) parameters and Virtual Coding Layer (VCL) HRD parameters for the Hypothetical Reference Decoder (HRD) for Scalable Video Coding (SVC). However, we do not consider other information in VUI, in particular, bitstream restriction information. Therefore, in accordance with the present principles, modifications are proposed for additional VUI information in SVC.

Thus, in accordance with the present principles, we propose to modify MPEG-4 AVC Standard Video Usability Information (VUI) for Scalable Video Coding (SVC). In an embodiment, we define VUI for each interoperability point (IOP) of SVC. In particular, we consider the bitstream restriction information in VUI and how to modify the bitstream restriction information for SVC. We also consider how to use Supplemental Enhancement Information (SEI) messages to convey VUI information for the MPEG-4 AVC Standard compatible case.

Currently, the Hypothetical Reference Decoder parameters in the Video VUI are set for each IOP for Scalable Video Coding, but the other VUI information uses only one set of VUI parameter for the bitstream. Since the decoder is supposed to decode only subsets of the video signals (corresponding to IOPs), the size of the data corresponding to each IOP which is required to be transmitted and decoded varies from IOP to IOP. Therefore, we believe that besides Hypothetical Reference Decoder parameters, some other VUI information should be sent to each IOP or a set of IOPs for some information. In particular, we are considering bitstream restriction information in VUI.

In an embodiment, we use bitstream restriction information as an example. However, it is to be appreciated that other VUI information may also be used in accordance with the present principles. That is, given the teachings of the present principles provided herein, one of ordinary skill in this and related arts will contemplate these and various other types of VUI information to which the present principles may be applied, while maintaining the spirit of the present principles.

In one embodiment, we propose a set of IOPs share the same bitstream restriction information. For example, all layers with the same dependency_id share the same bitstream restriction information.

In another embodiment, we propose defining the bitstream restriction information for each IOP. An IOP can be uniquely identified by the combination of dependency_id, temporal_id and quality_id. Given i is the index of IOP, the bitstream restriction information includes the following syntax:

bitstream_restriction_flag [i]—indicates that the bitstream restriction information for the current scalable layer is present in the SEI message. bitstream_restriction_flag[i] equal to 0 specifies that the bitstream restriction information for the scalable layer having the dependency_id equal to dependency_id[i], temporal_id equal to temporal_id[i] and quality_id equal to quality_id[i] is not present in the SEI message.

motion_vectors_over_pic_boundaries_flag [i]—specifies the value of motion_vectors_over_pic_boundaries_flag of the scalable layer having the dependency_id equal to dependency_id[i], temporal_id equal to temporal_id[i] and quality_id equal to quality_id[i]. When the motion_vectors_over_pic_boundaries_flag[i] syntax element is not present, motion_vectors_over_pic_boundaries_flag value of the scalable layer having the dependency_id equal to dependency_id[i], temporal_id equal to temporal_id[i] and quality_id equal to quality_id[i] shall be inferred to be equal to 1.

max_bytes_per_pic_denom [i]—specifies the max_bytes_per_pic_denom value of the scalable layer having the dependency_id equal to dependency_id[i], temporal_id equal to temporal_id[i] and quality_id equal to quality_id[i]. When the max_bytes_per_pic_denom[i] syntax element is not present, the value of max_bytes_per_pic_denom of the scalable layer having the dependency_id equal to dependency_id[i], temporal_id equal to temporal_id[i] and quality_id equal to quality_id[i] shall be inferred to be equal to 2.

max_bits_per_mb_denom [i]—specifies the max_bits_per_mb_denom value of the scalable layer having the dependency_id equal to dependency_id[i], temporal_id equal to temporal_id[i] and quality_id equal to quality_id[i]. When the max_bits_per_mb_denom[i] is not present, the value of max_bits_per_mb_denom of the scalable layer having the dependency_id equal to dependency_id[i], temporal_id equal to temporal_id[i] and quality_id equal to quality_id[i] shall be inferred to be equal to 1.

log2_max_mv_length_horizontal [i] and log2_max_mv_length_vertical [i]—specify the values of log2_max_mv_length_horizontal and log2_max_mv_length_vertical of the scalable layer having the dependency_id equal to dependency_id[i], temporal_id equal to temporal_id[i] and quality_id equal to quality_id[i]. When log2_max_mv_length_horizontal[i] is not present, the values of log2_max_mv_length_horizontal and log2_max_mv_length_vertical of the scalable layer having the dependency_id equal to dependency_id[i], temporal_id equal to temporal_id[i] and quality_id equal to quality_id[i] shall be inferred to be equal to 16.

num_reorder_frames [i]—specifies the value of num_reorder_frames of the scalable layer having the dependency_id equal to dependency_id[i], temporal_id equal to temporal_id[i] and quality_id equal to quality_id[i]. The value of num_reorder_frames[i] shall be in the range of 0 to max_dec_frame_buffering, inclusive. When the num_reorder_frames[i] syntax element is not present, the value of num_reorder_frames of the scalable layer having the dependency_id equal to dependency_id[i], temporal_id equal to temporal_id[i] and quality_id equal to quality_id[i] shall be inferred to be equal to max_dec_frame_buffering.

max_dec_frame_buffering [i] specifies the value of max_dec_frame_buffering of the scalable layer having the dependency_id equal to dependency_id[i], temporal_id equal to temporal_id[i] and quality_id equal to quality_id[i]. The value of max_dec_frame_buffering[i] shall be in the range of num_ref_frames[i] to MaxDpbSize (as specified in sub-clause A.3.1 or A.3.2 in the MPEG-4 AVC Standard), inclusive. When the max_dec_frame_buffering[i] syntax element is not present, the value of max_dec_frame_buffering of the scalable layer having the dependency_id equal to dependency_id[i], temporal_id equal to temporal_id[i] and quality_id equal to quality_id[i] shall be inferred to be equal to MaxDpbSize.

Moreover, TABLE 2 includes the proposed VUI syntax for this embodiment relating to defining bitstream restriction information for each IOP.

TABLE 2

| | C | Descriptor |
|---|---|---|
| vui_parameters( ) { | | |
|   aspect_ratio_info_present_flag | 0 | u(1) |
|   if( aspect_ratio_info_present_flag ) { | | |
|     aspect_ratio_idc | 0 | u(8) |
|     if( aspect_ratio_idc = = Extended_SAR ) { | | |
|       sar_width | 0 | u(16) |
|       sar_height | 0 | u(16) |
|     } | | |
|   } | | |
|   overscan_info_present_flag | 0 | u(1) |
|   if( overscan_info_present_flag ) | | |
|     overscan_appropriate_flag | 0 | u(1) |
|   video_signal_type_present_flag | 0 | u(1) |
|   if( video_signal_type_present_flag ) { | | |
|     video_format | 0 | u(3) |
|     video_full_range_flag | 0 | u(1) |
|     colour_description_present_flag | 0 | u(1) |
|     if( colour_description_present_flag ) { | | |
|       colour_primaries | 0 | u(8) |
|       transfer_characteristics | 0 | u(8) |
|       matrix_coefficients | 0 | u(8) |
|     } | | |
|   } | | |
|   chroma_loc_info_present_flag | 0 | u(1) |
|   if( chroma_loc_info_present_flag ) { | | |
|     chroma_sample_loc_type_top_field | 0 | ue(v) |
|     chroma_sample_loc_type_bottom_field | 0 | ue(v) |
|   } | | |
|   if( profile_idc = = 'SVC') { | | |
|     num_layers_minus1 | 0 | ue(v) |
|     for( i = 0; i <= num_layers_minus1; i++ ) { | | |
|       temporal_level[ i ] | 0 | u(3) |
|       dependency_id[ i ] | 0 | u(3) |
|       quality_level[ i ] | 0 | u(2) |
|       timing_info_present_flag[ i ] | 0 | u(1) |
|       if( timing_info_present_flag[ i ] ) { | | |
|         num_units_in_tick[ i ] | 0 | u(32) |
|         time_scale[ i ] | 0 | u(32) |
|         fixed_frame_rate_flag[ i ] | 0 | u(1) |
|       } | | |
|       nal_hrd_parameters_present_flag[ i ] | 0 | u(1) |
|       if( nal_hrd_parameters_present_flag[ i ] ) | | |
|         hrd_parameters( ) | | |
|       vcl_hrd_parameters_present_flag[ i ] | 0 | u(1) |
|       if( vcl_hrd_parameters_present_flag[ i ]) | | |
|         hrd_parameters( ) | | |
|       if( nal_hrd_parameters_present_flag[ i ] \|\| | | |
|         vcl_hrd_parameters_present_flag[ i ] ) | | |
|         low_delay_hrd_flag[ i ] | 0 | u(1) |
|       pic_struct_present_flag[ i ] | 0 | u(1) |
|       bitstream_restriction_flag [i] | 0 | u(1) |
|       if( bitstream_restriction_flag [i] ) { | | |
|         motion_vectors_over_pic_boundaries_flag [ i ] | 0 | u(1) |
|         max_bytes_per_pic_denom [ i ] | 0 | ue(v) |
|         max_bits_per_mb_denom [ i ] | 0 | ue(v) |
|         log2_max_mv_length_horizontal [ i ] | 0 | ue(v) |
|         log2_max_mv_length_vertical [ i ] | 0 | ue(v) |
|         num_reorder_frames [ i ] | 0 | ue(v) |
|         max_dec_frame_buffering [ i ] | 0 | ue(v) |
|       } | | |
|     } | | |
|   } else { | | |
|     timing_info_present_flag | 0 | u(1) |
|     if( timing_info_present_flag ) { | | |
|       num_units_in_tick | 0 | u(32) |
|       time_scale | 0 | u(32) |
|       fixed_frame_rate_flag | 0 | u(1) |
|     } | | |
|     nal_hrd_parameters_present_flag | 0 | u(1) |
|     if( nal_hrd_parameters_present_flag ) | | |
|       hrd_parameters( ) | | |
|     vcl_hrd_parameters_present_flag | 0 | u(1) |
|     if( vcl_hrd_parameters_present_flag ) | | |
|       hrd_parameters( ) | | |
|     if( nal_hrd_parameters_present_flag \|\| | | |
| vcl_hrd_parameters_present_flag ) | | |
|       low_delay_hrd_flag | 0 | u(1) |
|     pic_struct_present_flag | 0 | u(1) |

TABLE 2-continued

|  | C | Descriptor |
|---|---|---|
| } |  |  |
| bitstream_restriction_flag | 0 | u(1) |
| if( bitstream_restriction_flag ) { |  |  |
|   motion_vectors_over_pic_boundaries_flag | 0 | u(1) |
|   max_bytes_per_pic_denom | 0 | ue(v) |
|   max_bits_per_mb_denom | 0 | ue(v) |
|   log2_max_mv_length_horizontal | 0 | ue(v) |
|   log2_max_mv_length_vertical | 0 | ue(v) |
|   num_reorder_frames | 0 | ue(v) |
|   max_dec_frame_buffering | 0 | ue(v) |
| } |  |  |
| } |  |  |

Figure 3:
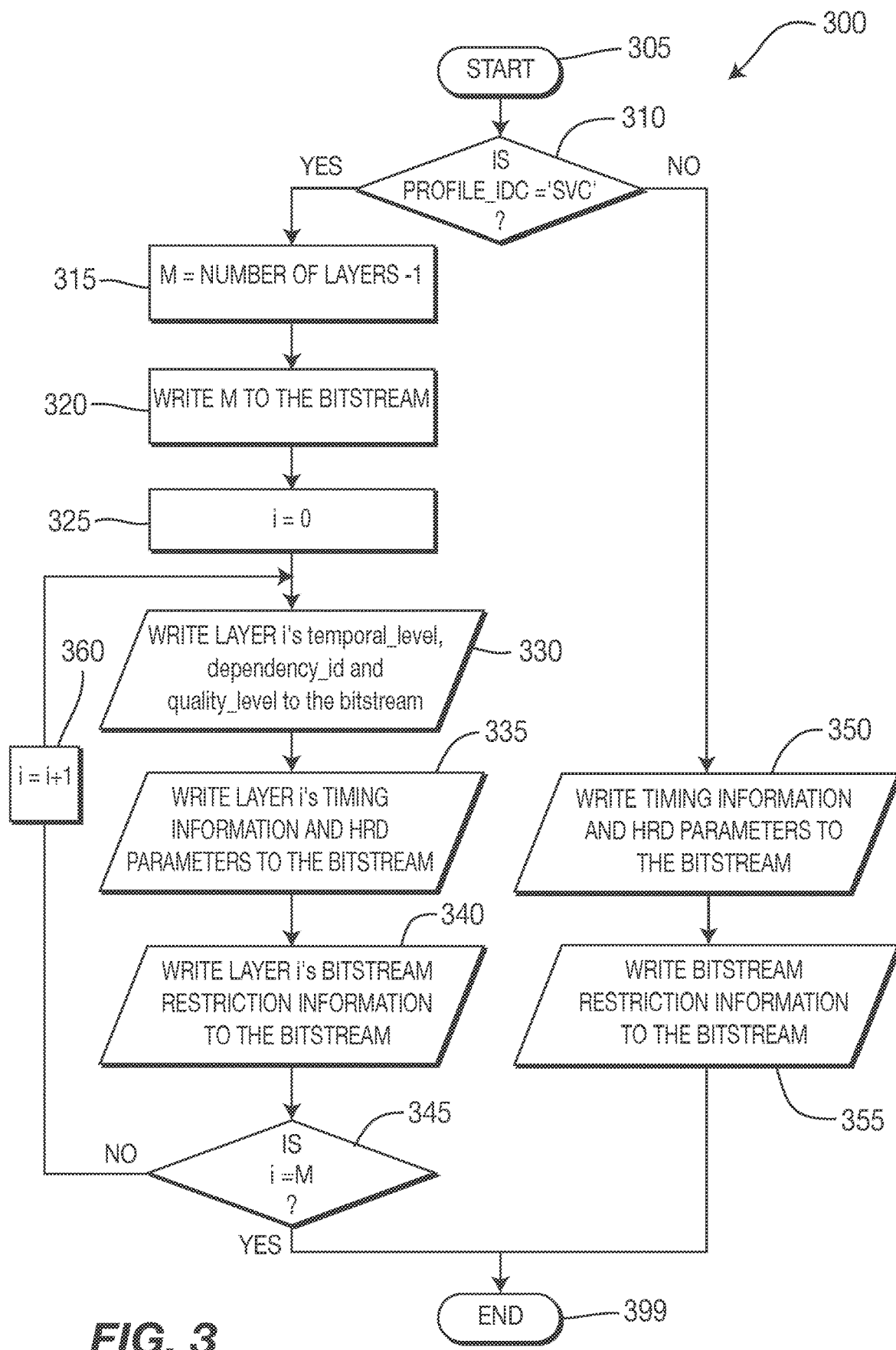
FIG. 3 is a flow diagram for an exemplary method for encoding Video User Information (VUI), in accordance with an embodiment of the present principles.

Turning to FIG. 3, an exemplary method for encoding Video User Information (VUI) is indicated generally by the reference numeral 300.

The method 300 includes a start block 305 that passes control to a decision block 310. The decision block 310 determines whether or not profile_idc is equal to SVC. If so, then control is passed to a function block 315. Otherwise, control is passed to a function block 350.

The function block 315 sets a variable M equal to the number of layers—1, and passes control to a function block 320. The function block 320 writes the variable M to the bitstream, and passes control to the function block 325. The function block 325 sets a variable i equal to zero, and passes control to a function block 330. The function block 330 writes layer i's temporal level, dependency_id, and quality_level to the bitstream, and passes control to a function block 335. The function block 335 writes layer i's timing information and HRD parameters to the bitstream, and passes control to a function block 340. The function block 340 writes layer i's bitstream restriction information to the bitstream, and passes control to a decision block 345. The decision block 345 determines whether or not the variable i is equal to the variable M. If so, control is passed to an end block 399. Otherwise, control is passed to a function block 360.

The function block 350 writes timing information and HRD parameters to the bitstream, and passes control to a function block 355. The function block 355 writes bitstream restriction information to the bitstream, and passes control to the end block 399.

The function block 360 increments the variable i by one, and returns control to the function block 330.

Figure 4:
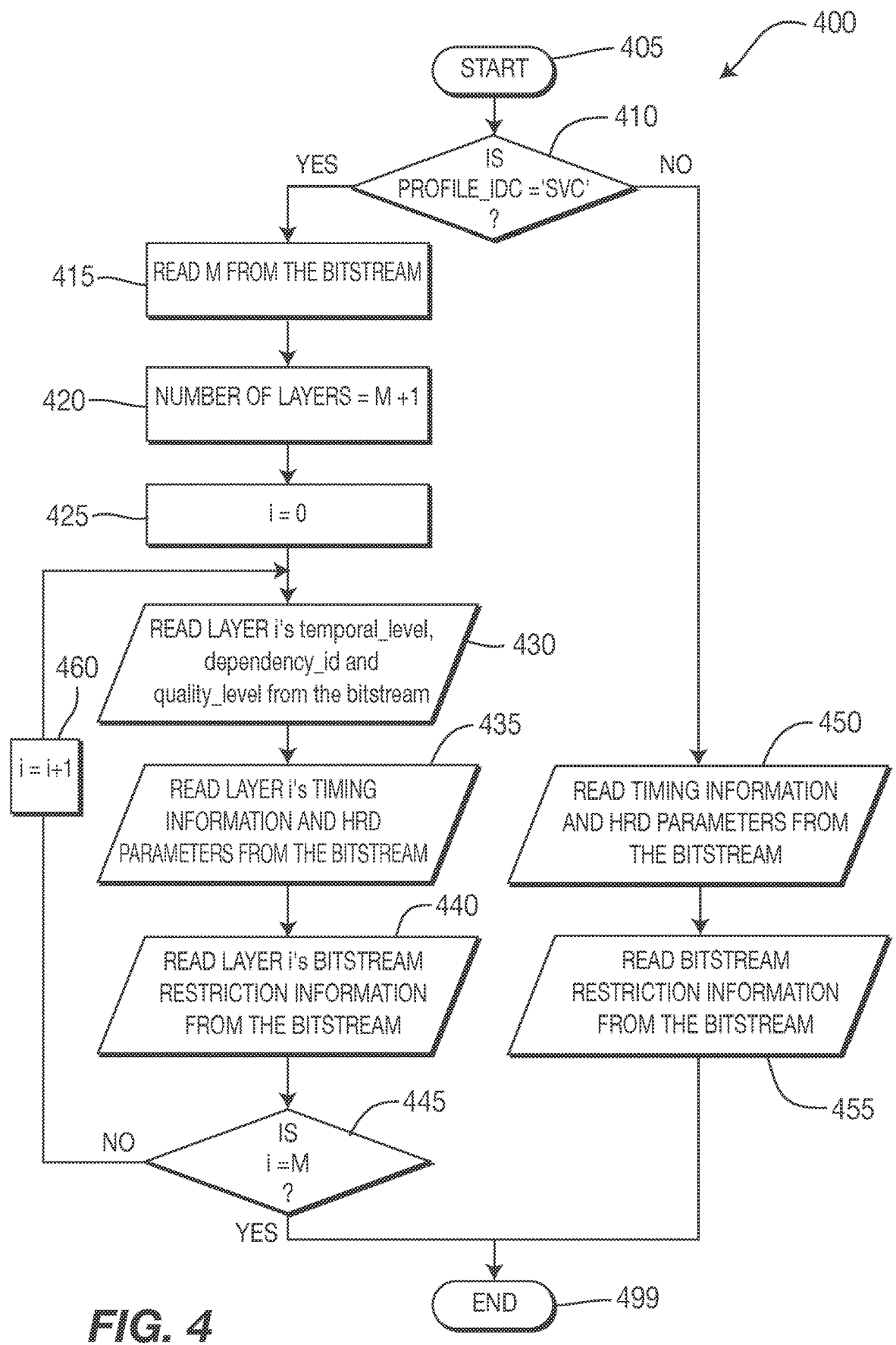
FIG. 4 is a flow diagram for an exemplary method for decoding Video User Information (VUI), in accordance with an embodiment of the present principles.

Turning to FIG. 4, an exemplary method for decoding Video User Information (VUI) is indicated generally by the reference numeral 400.

The method 400 includes a start block 405 that passes control to a decision block 410. The decision block 410 determines whether or not profile_idc is equal to SVC. If so, the control is passed to a function block 415. Otherwise, control is passed to a function block 450.

The function block 415 reads a variable M from the bitstream, and passes control to a function block 420. The function block 420 sets the number of layers equal to M+1, and passes control to a function block 425. The function block 425 sets a variable i equal to zero, and passes control to a function block 430. The function block 430 reads layer i's temporal_level, dependency_id, and quality_level from the bitstream, and passes control to a function block 435. The function block 435 reads layer i's timing information and HRD parameters from the bitstream, and passes control to a function block 440. The function block 440 reads layer i's bitstream restriction information from the bitstream, and passes control to a decision block 445. The decision block 445 determines whether or not the variable i is equal to the variable M. If so, the control is passed to an end block 499. Otherwise, control is passed to a function block 460.

The function block 450 reads timing information and HRD parameters from the bitstream, and passes control to a function block 455. The function block 455 reads bitstream restriction information from the bitstream, and passes control to the end block 499.

The function block 460 increments the variable i by one, and returns control to the function block 430.

SVC required the base layer to be compatible with the MPEG-4 AVC Standard. However, the MPEG-4 AVC Standard compatible bitstream may include several temporal layers. According to an embodiment of the present principles, we propose to use high level syntax to convey the bitstream restriction information for different temporal layers in an MPEG-4 AVC Standard compatible layer. In one embodiment, a Supplemental Enhancement Information (SEI) message is used. Of course, the present principles are not limited solely to the use of SEI messages with respect to high level syntax and, thus, other high level syntaxes may also be used in accordance with the present principles, while maintaining the spirit of the present principles. TABLE 3 illustrates a proposed AVC temporal Video User Information (VUI) Supplemental Enhancement Information (SEI) message, in accordance with an embodiment of the present principles. The following syntax definitions apply to the syntaxes set forth in TABLE 3.

TABLE 3

|  | C | Descriptor |
|---|---|---|
| avc_temporal_vui ( payloadSize ) { |  |  |
|   num_of_temporal_layers_in_base_layer_minus1 | 0 | ue(v) |
|   for( i = 0; i < |  |  |
|   num_of_temporal_layers_in_base_layer_minus1; i++){ |  |  |
|     temporal_level[ i ] | 0 | u(3) |
|     bitstream_restriction_flag | 0 | u(1) |
|     if( bitstream_restriction_flag ) { |  |  |
|       motion_vectors_over_pic_boundaries_flag | 0 | u(1) |
|       max_bytes_per_pic_denom | 0 | ue(v) |
|       max_bits_per_mb_denom | 0 | ue(v) |
|       log2_max_mv_length_horizontal | 0 | ue(v) |
|       log2_max_mv_length_vertical | 0 | ue(v) |
|       num_reorder_frames | 0 | ue(v) |
|       max_dec_frame_buffering | 0 | ue(v) |
|     } |  |  |
|   } |  |  |
| } |  |  |

Figure 5:
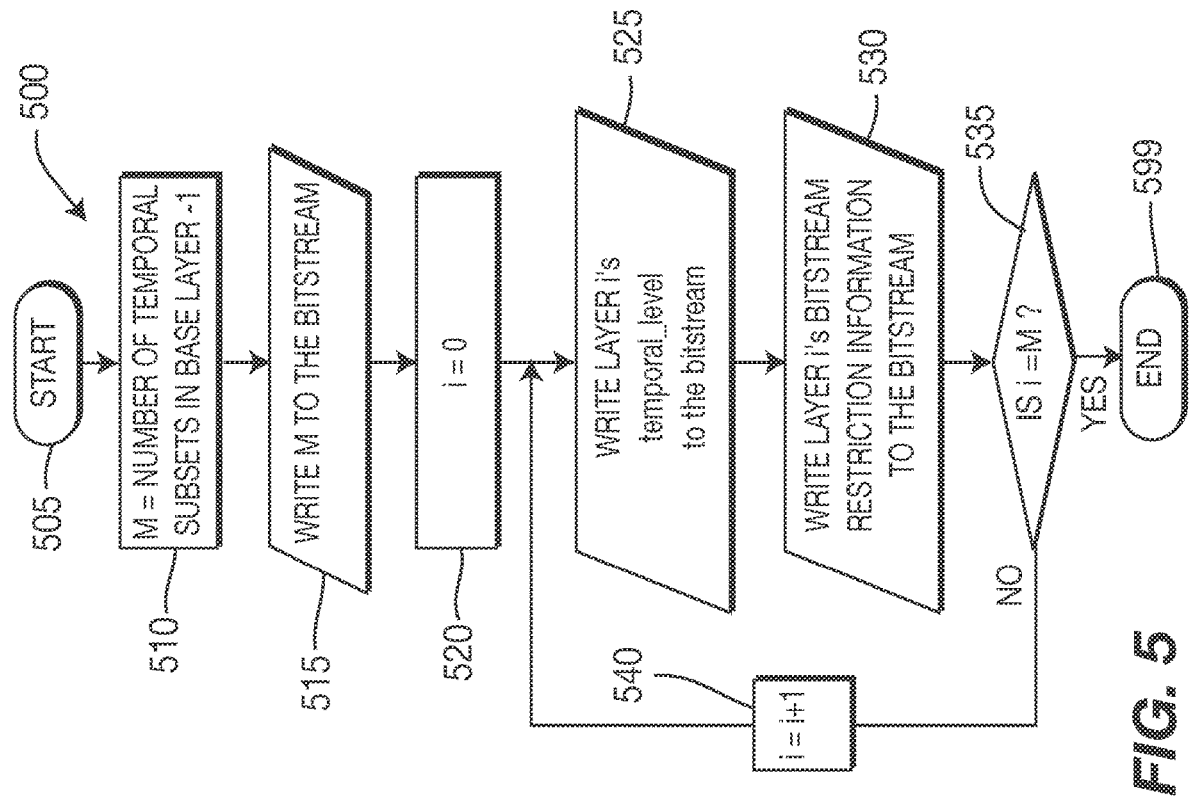
FIG. 5 is a flow diagram for an exemplary method for encoding an MPEG-4 AVC Standard temporal Supplemental Enhancement Information (SEI) message, in accordance with an embodiment of the present principles.

Turning to FIG. 5, an exemplary method for encoding an MPEG-4 AVC Standard temporal Supplemental Enhancement Information (SEI) message is indicated generally by the reference numeral 500.

The method 500 includes a start block 505 that passes control to a function block 510. The function block 510 sets a variable M equal to the number of temporal subsets in the base layer—1, and passes control to a function block 515. The function block 515 writes the variable M to the bitstream, and passes control to a function block 520. The function block 520 sets a variable i equal to zero, and passes control to a function block 525. The function block 525 writes layer i's temporal_level to the bitstream, and passes control to a function block 530. The function block 530 writes layer i's bitstream restriction information to the bitstream, and passes control to a decision block 535. The decision block 535 determines whether or not the variable i is equal to the variable M. If so, the control is passed to an end block 599. Otherwise, control is passed to a function block 540. The function block 540 increments the variable i by one, and returns control to the function block 525.

Figure 6:
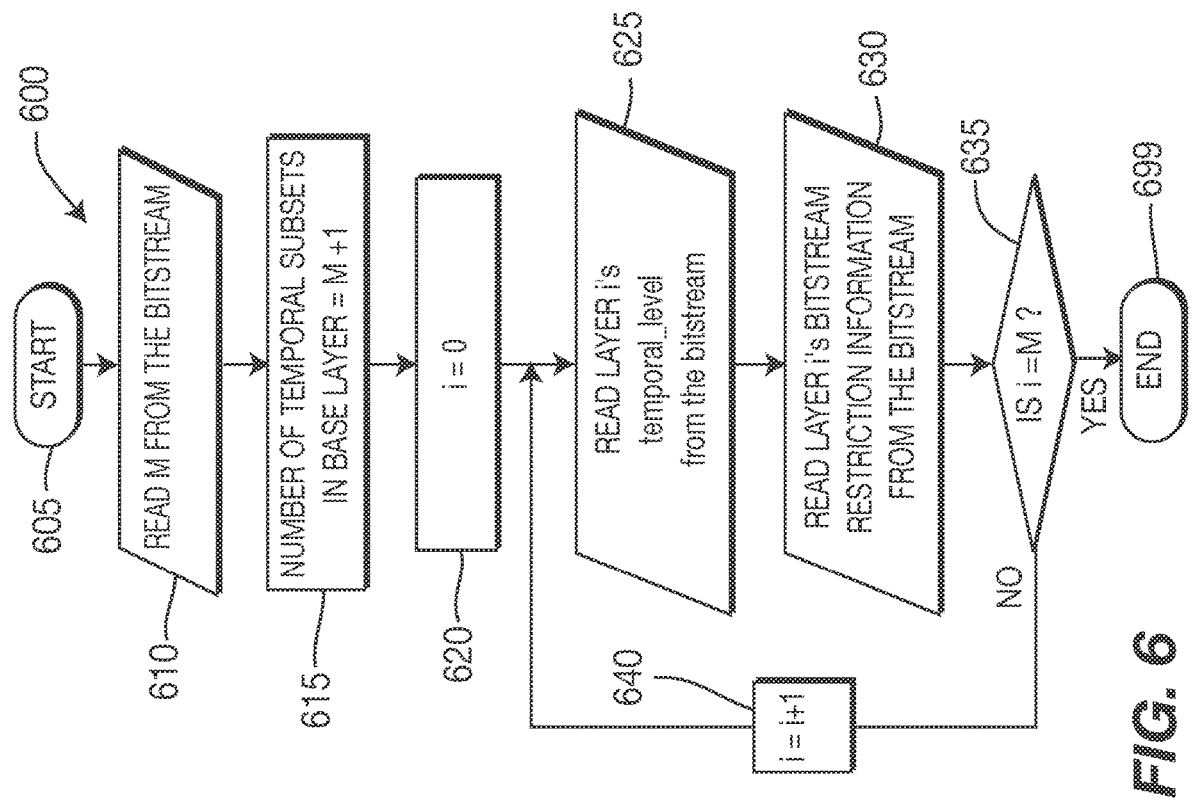
FIG. 6 is a flow diagram for an exemplary method for decoding an MPEG-4 AVC Standard temporal Supplemental Enhancement Information (SEI) message, in accordance with an embodiment of the present principles.

Turning to FIG. 6, an exemplary method for decoding an MPEG-4 AVC Standard temporal Supplemental Enhancement Information (SEI) message is indicated generally by the reference numeral 600.

The method 600 includes a start block 605 that passes control to a function block 610. The function block 610 reads a variable M from the bitstream, and passes control to a function block 615. The function block 615 sets the number of temporal subsets in the base layer equal to the variable M+1, and passes control to a function block 620. The function block 620 sets a variable i equal to zero, and passes control to a function block 625. The function block 625 reads layer i's temporal_level from the bitstream, and passes control to a function block 630. The function block 630 reads layer i's bitstream restriction information from the bitstream, and passes control to a decision block 635. The decision block 635 determines whether or not the variable i is equal to the variable M. If so, the control is passed to an end block 699. Otherwise, control is passed to a function block 640.

The function block 640 increments the variable i by one, and returns control to the function block 625.

TABLE 4 shows another implementation of the bitstream restriction information in Scalability information SEI message.

TABLE 4

| | C | Descriptor |
|---|---|---|
| scalability_info( payloadSize ) { | | |
|   temporal_id_nesting_flag | 5 | u(1) |
|   quality_layer_info_present_flag | 5 | u(1) |
|   priority_id_setting_flag | 5 | u(1) |
|   num_layers_minus1 | 5 | ue(v) |
|   for( i = 0; i <= num_layers_minus_1; i++ ) { | | |
|     layer_id[ i ] | 5 | ue(v) |
|     priority_id[ i ] | 5 | u(6) |
|     discardable_flag[ i ] | 5 | u(1) |
|     temporal_id[ i ] | 5 | u(3) |
|     dependency_id[ i ] | 5 | u(3) |
|     quality_id[ i ] | 5 | u(4) |
|     ... | | |
|     bitstream_restriction_info_present_flag[ i ] | 5 | u(1) |
|     ... | | |
|     if( bitstream_restriction_info_present_flag[ i ] ) { | | |
|       motion_vectors_over_pic_boundaries_flag[ i ] | 5 | u(1) |
|       max_bytes_per_pic_denom[ i ] | 5 | ue(v) |
|       max_bits_per_mb_denom[ i ] | 5 | ue(v) |
|       log2_max_my_length_horizontal[ i ] | 5 | ue(v) |
|       log2_max_my_length_vertical[ i ] | 5 | ue(v) |
|       num_reorder_frames[ i ] | 5 | ue(v) |
|       max_dec_frame_buffering[ i ] | 5 | ue(v) |
|     } | | |
|     ... | | |
|   } | | |
| } | | |

A description will now be given of some of the many attendant advantages/features of the present invention, some of which have been mentioned above. For example, one advantage/feature is an apparatus that includes an encoder for encoding video signal data into a bitstream. The encoder specifies video user information, excluding hypothetical reference decoder parameters, in the bitstream using a high level syntax element. The video user information corresponds to a set of interoperability points in the bitstream relating to scalable video coding.

Another advantage/feature is the apparatus having the encoder as described above, wherein the encoder specifies the video user information for each of the interoperability points in the bitstream relating to scalable video coding, including the set of interoperability points, using the high level syntax element.

Yet another advantage/feature is the apparatus having the encoder as described above, wherein the encoder specifies the video user information for each of the interoperability points relating to scalable video coding at a layer compatible with the International Organization for Standardization/International Electrotechnical Commission Moving Picture Experts Group-4 Part 10 Advanced Video Coding standard/International Telecommunication Union, Telecommunication Sector H.264 recommendation, using the high level syntax element.

Still another advantage/feature is the apparatus having the encoder as described above, wherein the video user information includes bitstream restriction information.

Moreover, another advantage/feature is the apparatus having the encoder wherein the video user information includes bitstream restriction information as described above, wherein the bitstream restriction information includes at least one of a motion_vectors_over_pic_boundaries_flag syntax element, a max_bytes_per_pic_denom syntax element, a max_bits_per_mb_denom syntax element, a log2_max_mv_length_horizontal syntax element, a log2_max_mv_length_vertical syntax element, a num_reorder_frames syntax element, and a max_dec_frame_buffering syntax element.

Further, another advantage/feature is the apparatus having the encoder as described above, wherein the high level syntax element corresponds to at least at one of a slice header level, a sequence parameter set level, a picture parameter set level, a network abstraction layer unit header level, and a level corresponding to a supplemental enhancement information message.

Also, another advantage/feature is the apparatus having the encoder as described above, wherein a profile_idc syntax element is used to differentiate the bitstream for scalable video coding or for compliance with the International Organization for Standardization/International Electrotechnical Commission Moving Picture Experts Group-4 Part 10 Advanced Video Coding standard/International Telecommunication Union, Telecommunication Sector H.264 recommendation.

Additionally, another advantage/feature is the apparatus having the encoder as described above, wherein the encoder writes a dependency_id syntax element, a temporal_level syntax element, and a quality_level syntax element to the bitstream for at least each of the interoperability points in the set.

Moreover, another advantage/feature is the apparatus having the encoder as described above, wherein the encoder writes a temporal_level syntax element and a quality_level syntax element to the bitstream for at least each of the interoperability points in the set.

Further, another advantage/feature is the apparatus having the encoder as described above, wherein the encoder writes a temporal_level syntax element to the bitstream for at least each of the interoperability points in the set.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method, comprising:
encoding video signal data into a bitstream, said bitstream including a plurality of operation points;
encoding at least a syntax element indicating a number of operation points in said bitstream; and
specifying a plurality of bitstream restriction information using a parameter set,
wherein a first one of said plurality of bitstream restriction information is specified for a first subset of said plurality of operation points,
wherein a second one of said plurality of bitstream restriction information is specified for a second subset of said plurality of operation points, and
wherein each of said plurality of bitstream restriction information specifies one or more of a maximal number of reordering frames and a maximal decoded frame buffer size.

2. The method of claim 1, further comprising encoding one or more of: (1) a syntax element indicative of dependency ID, (2) a syntax element indicative of temporal level, and (3) a syntax element indicative of quality level to said bitstream for each operation point in said first subset.

3. The method of claim 1, further comprising encoding a syntax element indicative of temporal level to said bitstream for each temporal level in said bitstream.

4. The method of claim 1, wherein said parameter set is a sequence parameter set or a picture parameter set.

5. A non-transitory machine readable medium having stored thereon machine executable instructions that, when executed, implement the method according to claim 1.

6. A method, comprising:
accessing a bitstream including a plurality of operation points;
decoding at least a syntax element indicating a number of operation points in said bitstream;
determining a plurality of bitstream restriction information from a parameter set in said bitstream,
wherein a first one of said plurality of bitstream restriction information is specified for a first subset of said plurality of operation points,
wherein a second one of said plurality of bitstream restriction information is specified for a second subset of said plurality of operation points, and
wherein each of said plurality of bitstream restriction information specifies one or more of a maximal number of reordering frames and a maximal decoded frame buffer size; and
decoding at least one operation point from said bitstream.

7. The method of claim 6, further comprising decoding one or more of (1) a syntax element indicative of dependency ID, (2) a syntax element indicative of temporal level, and (3) a syntax element indicative of quality level from said bitstream for each operation point in said first subset.

8. The method of claim 6, further comprising decoding a syntax element indicative of temporal level from said bitstream for each temporal level in said bitstream.

9. The method of claim 6, wherein said parameter set is a sequence parameter set or a picture parameter set.

10. The method of claim 6, wherein said at least one decoded operation point corresponds to a base layer.

11. A non-transitory machine readable medium having stored thereon machine executable instructions that, when executed, implement the method according to claim 6.

12. An apparatus, comprising:
at least a memory and one or more processors coupled to said at least a memory, wherein said one or more processors are configured to:
encode video signal data into a bitstream, said bitstream including a plurality of operation points;
encode at least a syntax element indicating a number of operation points in said bitstream; and
specify a plurality of bitstream restriction information using a parameter set, wherein a first one of said plurality of bitstream restriction information is specified for a first subset of said plurality of operation points,
wherein a second one of said plurality of bitstream restriction information is specified for a second subset of said plurality of operation points, and
wherein each of said plurality of bitstream restriction information specifies one or more of a maximal number of reordering frames and a maximal decoded frame buffer size.

13. The apparatus of claim 12, wherein said one or more processors are configured to encode one or more of (1) a syntax element indicative of dependency ID, (2) a syntax element indicative of temporal level, and (3) a syntax element indicative of quality level to said bitstream for each operation point in said first subset.

14. The apparatus of claim 12, wherein said one or more processors are configured to encode a syntax element indicative of temporal level to said bitstream for each temporal level in said bitstream.

15. The apparatus of claim 12, wherein said parameter set is a sequence parameter set or a picture parameter set.

16. An apparatus, comprising:
- at least a memory and one or more processors coupled to said at least a memory, wherein said one or more processors are configured to:
- access a bitstream including a plurality of operation points;
- decode at least a syntax element indicating a number of operation points in said bitstream;
- determine a plurality of bitstream restriction information from a parameter set in said bitstream,
- wherein a first one of said plurality of bitstream restriction information is specified for a first subset of said plurality of operation points,
- wherein a second one of said plurality of bitstream restriction information is specified for a second subset of said plurality of operation points, and
- wherein each of said plurality of bitstream restriction information specifies one or more of a maximal number of reordering frames and a maximal decoded frame buffer size; and
- decoding at least one operation point from said bitstream.

17. The apparatus of claim 16, wherein said one or more processors are configured to decode one or more of (1) a syntax element indicative of dependency ID, (2) a syntax element indicative of temporal level, and (3) a syntax element indicative of quality level from said bitstream for each of said operation points in said first subset.

18. The apparatus of claim 16, wherein said one or more processors are configured to decode a syntax element indicative of temporal level from said bitstream for each temporal level in said bitstream.

19. The apparatus of claim 16, wherein said at least one decoded operation point corresponds to a base layer.

20. The apparatus of claim 16, wherein said parameter set is a sequence parameter set or a picture parameter set.

* * * * *